UNITED STATES PATENT OFFICE.

WILHELM LOMMEL, OF ELBERFELD, GERMANY, ASSIGNOR TO FARBENFABRIKEN VORM. FRIEDR. BAYER & CO., OF ELBERFELD, GERMANY, A CORPORATION OF GERMANY.

LEUCO DERIVATIVE OF THE GALLOCYANIN SERIES.

No. 893,855.     Specification of Letters Patent.     Patented July 21, 1908.

Application filed March 31, 1908. Serial No. 424,324.

*To all whom it may concern:*

Be it known that I, WILHELM LOMMEL, doctor of philosophy, chemist, citizen of the German Empire, residing at Elberfeld, Germany, Kingdom of Prussia, have invented new and useful Improvements in New Leuco Derivatives of the Gallocyanin Series, of which the following is a specification.

I have found that new and valuable leucocompounds of the gallocyanin series can be obtained by treating dyestuffs of this series with compounds containing the glycin radical ($-NH.CH_2.COOH$) such as phenylglycin, naphthylglycin, aminophenylglycin, dialkylaminophenylglycin, oxyphenylglycin, sulfonic or carboxylic acids of these products or the like.

The new leucocompounds are in the shape of their hydrochlorids easily soluble in water with a yellowish-brown to brownish-red color. On adding sodium acetate or sodium carbonate to these solutions the yellowish-green to bluish-green bases separate out which oxidize on exposure to air. They produce in dyeing or printing from blue to violet valuable shades.

The following examples will serve to further illustrate my invention, the parts being by weight:

Example I.—35 parts of celestin blue (obtained from nitrosodiethylanilin and gallaminic acid) are introduced into a mixture heated to 115°, of 17 parts of phenylglycin with 35 parts of glycerin. The mixture is heated for about 2 hours until foaming ceases and a test portion dissolves in dilute hydrochloric acid with a brownish-red color. Subsequently the melt is dissolved in a mixture of about 80 parts of water and 12 parts of hydrochloric acid of 19° Bé. The solution thus obtained can be used without further purification for dyeing or printing. When printed on cotton with chrome mordants this solution furnishes navy-blue shades. The solution of the hydrochlorid of the new leucocompound has a brownish-red color. By the addition of sodium acetate the leucocompound separates out in the shape of a yellowish-green product which turns blue on exposure to air. It is soluble in concentrated sulfuric acid with a brown color which turns blue by the addition of sodium nitrite.

Example II.—In a vessel provided with a reflux condenser a mixture of 65 parts of gallocyanin (obtained from nitrosodimethylanilin and gallic acid), 31 parts of phenylglycin, 24 parts of hydrochloric acid of 19° Bé. and 300 parts of water is heated to boiling for about 1½ hours until all the dyestuff has entered into reaction. The new leucocompound produces a dark-blue chrome-lake on cotton.

Other glycins, *e. g.* meta-aminophenylglycin, etc. other gallocyanins or other diluting agents may be employed. The free bases of the gallocyanins can also be used.

Having now described my invention and in what manner the same is to be performed what I claim as new and desire to secure by Letters Patent is:—

1. The herein-described process for producing new leucocompounds of the gallocyanin series, which process consists in treating dyestuffs of the gallocyanin series with compounds containing the glycin radical, substantially as described.

2. The herein-described process for producing a new leucocompound of the gallocyanin series, which process consists in heating celestin blue with phenylglycin, substantially described.

3. The herein-described new leucocompounds of the gallocyanin series which in the shape of the hydrochlorids are easily soluble in water with a yellowish-brown to brownish-red color, the free bases being separated in the shape of yellowish-green to bluish-green compounds by adding sodium acetate to the aqueous solutions; and produce when printed with chromium compounds on cotton from blue to violet shades, substantially as described.

4. The herein-described new leucocompound of the gallocyanin series obtainable by heating celestin blue with phenylglycin, which new leucocompound in the shape of its hydrochlorid dissolves in water with a brownish-red color, a yellowish-green product being separated by the addition of sodium acetate, dissolves in concentrated sulfuric acid with a brown color turning blue by the addition of sodium nitrite; and produces when printed with chromium compounds on cotton navy-blue shades, substantially as described.

In testimony whereof I have hereunto set my hand in the presence of two subscribing witnesses.

WILHELM LOMMEL.

Witnesses:
 OTTO KÖNIG,
 WM. WASHINGTON BRUNSWICK.

---

It is hereby certified that in Letters Patent No. 893,855, granted July 21, 1908, upon the application of Wilhelm Lommel, of Elberfeld, Germany, for an improvement in "Leuco Derivatives of the Gallocyanin Series," an error appears in the printed specification requiring correction, as follows: In line 80, page 1, after the word "substantially," the word *as* should be inserted; and that the said Letters Patent should be read with this correction therein that the same may conform to the record of the case in the Patent Office.

Signed and sealed this 8th day of September, A. D., 1908.

[SEAL.]

C. C. BILLINGS,
*Acting Commissioner of Patents.* separated by the addition of sodium acetate, dissolves in concentrated sulfuric acid with a brown color turning blue by the addition of sodium nitrite; and produces when printed with chromium compounds on cotton navy-blue shades, substantially as described.

In testimony whereof I have hereunto set my hand in the presence of two subscribing witnesses.

WILHELM LOMMEL.

Witnesses:
 OTTO KÖNIG,
 WM. WASHINGTON BRUNSWICK.

---

Correction in Letters Patent No. 893,855.

It is hereby certified that in Letters Patent No. 893,855, granted July 21, 1908, upon the application of Wilhelm Lommel, of Elberfeld, Germany, for an improvement in "Leuco Derivatives of the Gallocyanin Series," an error appears in the printed specification requiring correction, as follows: In line 80, page 1, after the word "substantially," the word *as* should be inserted; and that the said Letters Patent should be read with this correction therein that the same may conform to the record of the case in the Patent Office.

Signed and sealed this 8th day of September, A. D., 1908.

[SEAL.]

C. C. BILLINGS,
*Acting Commissioner of Patents.*

Correction in Letters Patent No. 893,855.

It is hereby certified that in Letters Patent No. 893,855, granted July 21, 1908, upon the application of Wilhelm Lommel, of Elberfeld, Germany, for an improvement in "Leuco Derivatives of the Gallocyanin Series," an error appears in the printed specification requiring correction, as follows: In line 80, page 1, after the word "substantially," the word *as* should be inserted; and that the said Letters Patent should be read with this correction therein that the same may conform to the record of the case in the Patent Office.

Signed and sealed this 8th day of September, A. D., 1908.

[SEAL.]

C. C. BILLINGS,
*Acting Commissioner of Patents.*